United States Patent [19]

Perrott

[11] Patent Number: 4,644,972

[45] Date of Patent: Feb. 24, 1987

[54] FLOATING SEAL VALVE ASSEMBLY

[75] Inventor: Charles H. Perrott, Portland, Oreg.

[73] Assignee: Precision Plumbing Products, Inc., Portland, Oreg.

[21] Appl. No.: 754,094

[22] Filed: Jul. 12, 1985

[51] Int. Cl.⁴ .............................................. F16K 17/04
[52] U.S. Cl. .................................... 137/883; 137/881; 137/530; 137/543.13
[58] Field of Search ................... 137/881, 883, 543.13, 137/524, 530

[56] References Cited

U.S. PATENT DOCUMENTS

| | | | |
|---|---|---|---|
| 135,220 | 1/1873 | Harong | 137/883 |
| 1,044,106 | 11/1912 | Vidar | 137/524 |
| 1,320,446 | 11/1919 | Clark, Jr. | 251/160 |
| 1,609,430 | 12/1926 | Schlesinger | 137/883 |
| 1,651,778 | 12/1927 | Rice | 137/543.13 |
| 1,750,485 | 3/1930 | Muller, Jr. | 137/883 |
| 2,088,666 | 8/1937 | Portl | 251/160 |
| 2,311,506 | 2/1943 | Arey | 251/160 |

Primary Examiner—A. Michael Chambers
Attorney, Agent, or Firm—Eugene D. Farley

[57] ABSTRACT

A valve assembly for the control of pressurized fluids. The assembly comprises a casing housing a valve chamber with communicating inlet and outlet ports. A valve seat and valve-operating subassembly is associated with one of the ports. The valve-operating subassembly comprises a valve body threaded into the casing adjacent the valve seat. The valve body has an axial bore which receives a headed shaft having a seal washer mounted on its head in separable engagement with the valve seat. Resilient means, e.g. a coil spring, urges the washer in the direction of engagement with the valve seat with a force less than the force of the pressurized fluid introduced into the chamber. The shaft and/or seal washer preferably are mounted for free rotation to minimize scuffing of the washer during operation of the valve. The casing preferably comprises a manifold having two or more outlet ports with a valve-operating subassembly associated with at least one of them to prevent contamination of fluid discharged therethrough with foreign materials inadvertently introduced into the valve chamber.

3 Claims, 4 Drawing Figures

FLOATING SEAL VALVE ASSEMBLY

BACKGROUND AND GENERAL STATEMENT OF THE INVENTION

This invention relates to valves for the control of the flow through conduits of water and other fluids. It pertains particularly to valves of the class including a seal washer provided with means for preventing scuffing of the washer during operation of the valve and with means for preventing contamination of fluid passed by the valve with foreign material inadvertently introduced into the valve chamber. The valve is described herein with particular reference to valves for domestic water lines, although no limitation thereby is intended.

In the dispensing of water through conduits in both domestic and industrial installations, there are many situations where a single source is tapped to divert the water from that source to two or more applications. For example, it may be desired to divert water from a pressurized domestic source to the operation of a kidney dialysis machine. This is usually accomplished by tapping into the pressurized cold water house line which normally feeds also a domestic water outlet.

In a similar manner, it is often the practice to tap into the pressurized house line to supply water for mortuaries, hospitals, laboratories, laundries, chemical processing installations and the like. All of these introduce into possible communication with the domestic tap serious sources of contamination. Examples of such sources are the formaldehyde wash waters used for disinfecting kidney machines; mortuary fluids and wash water; bacteriologically contaminated laboratory solutions; poisonous chemical solutions, etc.

No problem exists as long as a normal pressure is maintained on the house line supplying water under pressure to the installation. However, in the event of failure of the pressurized water source, disconnecting the pressurized line for purposes of installation or repair; or other occurrences, circumstances frequently arise wherein the pressure in the pressurized house line is sharply reduced. A vacuum may even be created. In such occurrences, contaminating fluids may be drawn into the system and subsequently discharged through the domestic tap.

It is the general purpose of the present invention to provide a valve assembly which positively prevents such a result.

It is another object of the present invention to provide a valve assembly for the control of the flow of water through conduits which assembly incorporates a seal washer with associated means for minimizing the wear or scuffing of the washer during operation of the valve.

It is a further object of the present invention to provide a valve assembly which accomplishes the purposes outlined above and which in addition is simple in construction, inexpensive to manufacture, positive in its action, versatile in its application, easy to maintain, and having a long service life.

The foregoing and other objects of this invention are achieved by the provision of a floating, seal valve assembly comprising a casing housing a valve chamber. An inlet port and an outlet port communicate with the valve chamber. A valve seat and valve-operating subassembly are associated with at least one of the ports, preferably the outlet port.

Each valve-operating subassembly comprises an axially bored valve body threaded into the casing adjacent the valve seat. A headed shaft is mounted in the bore. A seal washer is mounted on the head of the shaft.

A coil spring or other resilient means is mounted on the shaft for urging the washer in the direction of engagement with the valve seat with a force less than the force of the pressurized fluid to be introduced into the chamber. The shaft and/or seal washer preferably are rotatably mounted to minimize wear of the washer during use of the valve.

During such use, the pressure of the water from the house line overcomes the force of the spring when the valve is open. The valve then dispenses water in the normal manner. However, in the event of failure of water pressure in the house line, the spring or other resilient means maintains the valve in a closed position so that backup of harmful fluids cannot occur.

THE DRAWINGS

DESCRIPTION OF A SPECIFIC EMBODIMENT OF THE INVENTION

Figure 1:
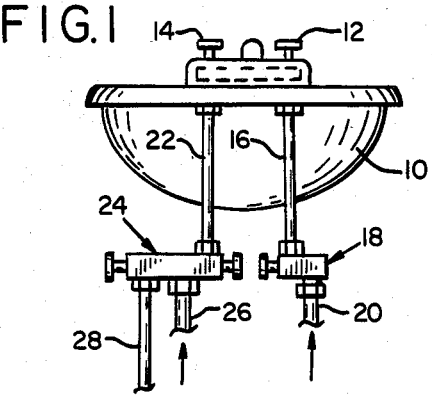
FIG. 1 is a schematic view in front elevation of a domestic wash bowl installation incorporating the hereindescribed floating, seal valve assembly.
Figure 2:
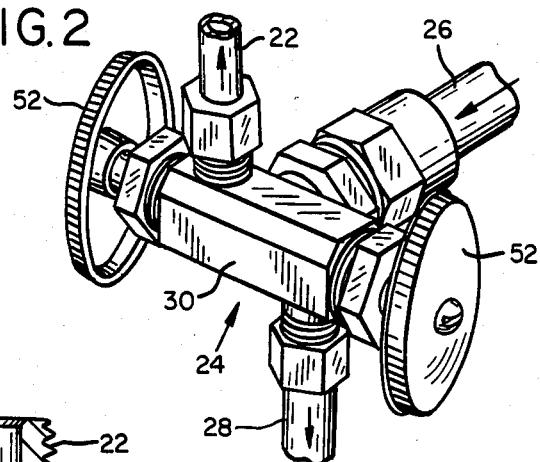
FIG. 2 is a top perspective view of the assembly.

FIG. 1 illustrates a conventional wash bowl 10 having a hot water tap 12 and a cold water tap 14.

The hot water tap is fed with hot water through a line including conduit 16, shut off valve 18 and house hot water line 20.

Cold water tap 14 is fed through a conduit system including conduit 22, the hereindescribed floating, seal valve assembly 24 and house cold water line 26.

The illustrated floating, seal valve assembly 24 dispenses cold water not only to tap 14 via conduit 22, but to a selected other application through conduit 28. Such other application might be one of those mentioned above, such as a kidney dialysis machine, a mortuary processing installation, a laboratory unit, or chemical reactor. In the event of failure of pressure in house line 26, with the resultant establishment of reduced, zero, or negative pressure in valve 24, contaminating fluids potentially could be drawn into conduit 28 and transferred to conduit 22 upon the resumption of pressurized service. The presently described seal valve assembly is designed to prevent the occurrence of such a transfer.

In the embodiment of the drawings, the hereindescribed valve assembly comprises a valve casing in the form of a manifold 30 having an inlet port 32, a first outlet port 34 and a second outlet port 36. Inlet port 32 communicates with pressurized house line 26. Outlet port 34 communicates with conduit 22 leading to cold water tap 14. Outlet port 36 communicates with conduit 28 leading to the dialysis machine or other installation which it is desired to seal off.

All of the ports communicate with a valve chamber 38. The chamber is provided with a pair of valve seats: a first valve seat 40 and a second valve seat 42.

A pair of identical valve-operating subassemblies is associated, one with each of the valve seats.

The first, valve subassembly 44, controls the flow of water to the dialysis machine or other installation. The second, valve subassembly 46, controls the flow of water to tap 14. Since the construction and mode of operation of both subassemblies are similar, only the first is described herein.

Threaded into one end of manifold 30 is a valve body 48 with integral stem 50. An operating handle 52 is fixed to the outer end of stem 50. A seal nut 54 with associated washer 56 and seal disc 58 seals off the end of the manifold.

Valve body 48 is provided with an axial bore 60 which opens out into valve chamber 38. A shaft 62 having an outer flange 64 and spaced head 66 is mounted for free rotation within bore 60, adjacent valve seat 30.

A seal washer 68 is mounted for free rotation on a section of reduced diameter of shaft 62, between flange 64 and head 66. This is fabricated from rubber, synthetic rubber, or suitable plastic materials. In the operation of the valve, it bears detachably against valve seat 68.

Resilient means are provided for maintaining seal washer 40 in sealing engagement with valve seat 40 in the event of failure of pressure in house line 26.

In the illustrated form of the invention such means comprises a coil spring 70. This preferably is made of stainless steel and is mounted on shaft 62 with one of its ends bearing against valve body 48 and the other of its ends bearing against flange 64.

The thrust force exerted by the spring is predetermined to be less than the pressure of water in house line 26. Accordingly, when the valve is open, the house line pressure separates seal washer 68 from its associated valve seat. However, in the event of failure of pressure in house line 26, the force of the spring is sufficient to press the seal washer against the seat.

OPERATION

Figure 3:
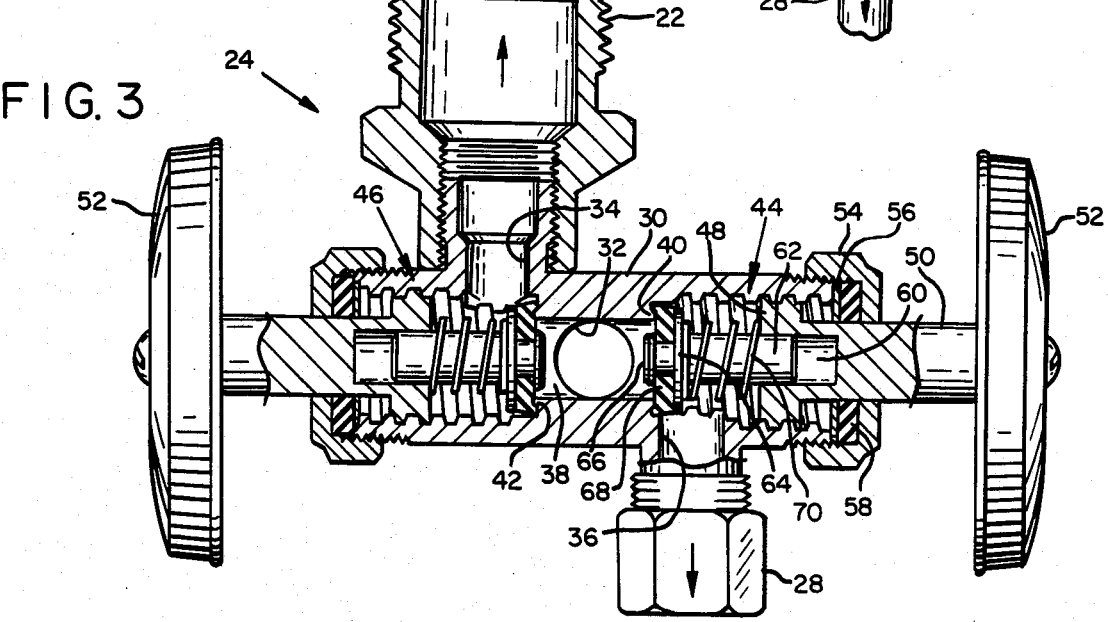
FIG. 3 is a longitudinal sectional view of the assembly with the valve chamber in its unpressurized condition.

The operation of the hereindescribed floating, seal valve assembly is as follows:

When the two valve subassemblies 44 and 46 are in closed position with the valve chamber 38 fully pressurized, water cannot flow from pressurized house line 26 through either of conduits 22, 28 (FIG. 3). However, when flow is desired to tap 14, valve subassembly 46 may be opened. When flow is desired to a kidney dialysis machine or other appliance, valve subassembly 44 may be adjusted to the open position. In this position, the force of spring 70, which urges the valve to the closed position, is overcome by the pressure of the water in line 26.

Figure 4:
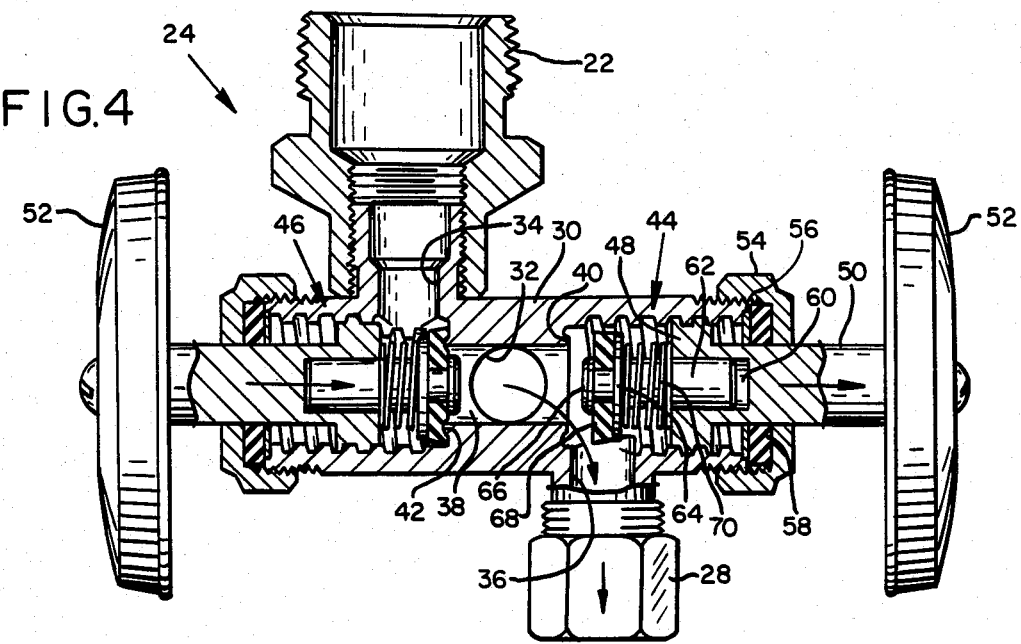
FIG. 4 is a longitudinal sectional view similar to FIG. 3 but illustrating the assembly with the valve chamber in its pressurized condition.

However, in the event of disconnection of line 26, or failure of the pressurized source of water, (FIG. 4) the pressure within valve chamber 38 will be sharply reduced, or even made negative. The force of spring 70 then will be strong enough to close either or both of valve subassemblies 44, 46, preventing backup of any deleterious fluids from line 28 into conduit 22 and cold water tap 14. This is true even if one or both of the valve subassemblies is in the open position.

Having thus described my invention in preferred embodiments, I claim:

1. A floating seal valve assembly, comprising:
   (a) a casing housing a valve chamber,
   (b) a normally pressurized fluid inlet communicating with the chamber,
   (c) a first outlet in the casing communicating with the chamber,
   (d) a first valve seat in the casing associated with the first outlet,
   (e) a first valve body in the chamber movable toward and away from the first valve seat,
   (f) a first valve seal on the first valve body movable with and relative to the latter toward and away from the first valve seat to open and close the first outlet,
   (g) a second outlet in the casing communicating with the chamber,
   (h) a second valve seat in the casing associated with the second outlet,
   (i) a second valve body in the chamber movable toward and away from the second valve seat,
   (j) a second valve seal on the second valve body movable with and relative to the latter toward and away from the second valve seat to open and close the second outlet, and
   (k) resilient means interengaging each seal and its associated valve body and operable to exert a seat-closing force on the associated seal which is less than the seat-opening force on said seal exerted by the normal inlet fluid pressure at the inlet to the chamber, whereby to prevent back flow of fluid from the associated outlet to the chamber upon reduction of said normal inlet fluid pressure to a force below the seat-closing force of the resilient means.

2. The valve assembly of claim 1 wherein each valve body is threaded into the casing adjacent the associated valve seat and has an axial bore therein, a headed shaft is mounted slidably in the bore, the valve seal is mounted on the head of the shaft, the resilient means is a coil spring on the shaft bearing at one end against the valve body and at the opposite end against the shaft head, and means on the outer end of each valve shaft for rotating it to move the valve seal between one position in which it is closed positively against the seat by the valve body and a second position in which it is closed resiliently against the seat by the resilient means when the fluid pressure in the chamber is less than the closing force of the resilient means.

3. The valve assembly of claim 2 wherein the headed shaft is mounted for free rotation in the bore of the valve body and the valve seal is mounted for free rotation on the head of the shaft.